US007848878B2

(12) United States Patent  
Cho et al.

(10) Patent No.: US 7,848,878 B2  
(45) Date of Patent: Dec. 7, 2010

(54) GEOGRAPHIC INFORMATION TRANSCEIVING SYSTEM AND METHOD THEREOF

(75) Inventors: Sammo Cho, Daejon (KR); Geon Kim, Daejon (KR); Hyun Lee, Daejon (KR); Gwang-Soon Lee, Daejon (KR); Young-Kwon Hahm, Daejon (KR); Chung-hyun Ahn, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1044 days.

(21) Appl. No.: 10/584,839

(22) PCT Filed: Sep. 14, 2004

(86) PCT No.: PCT/KR2004/002336

§ 371 (c)(1),  
(2), (4) Date: Jun. 26, 2006

(87) PCT Pub. No.: WO2005/064942

PCT Pub. Date: Jul. 14, 2005

(65) Prior Publication Data

US 2008/0095096 A1    Apr. 24, 2008

(30) Foreign Application Priority Data

Dec. 27, 2003  (KR)  ............... 10-2003-0098407  
May 27, 2004  (KR)  ............... 10-2004-0037919

(51) Int. Cl.  
*G01C 21/00*  (2006.01)

(52) U.S. Cl. ...................... 701/200; 701/208

(58) Field of Classification Search ......... 701/200–202, 701/117–119, 211, 208; 342/357.09, 357.1; 370/328, 310

See application file for complete search history.

(56) References Cited

U.S. PATENT DOCUMENTS 6,978,206 B1 * 12/2005 Pu et al. ............... 701/200  
7,043,357 B1 *  5/2006 Stankoulov et al. ...... 701/200

FOREIGN PATENT DOCUMENTS

| DE | 3536820 | 4/1987 |
| DE | 03810179 | 5/1989 |
| EP | 1 063 625 A1 | 6/2000 |

(Continued)

*Primary Examiner*—Yonel Beaulieu  
(74) *Attorney, Agent, or Firm*—Blakely, Sokoloff, Taylor & Zafman

(57) ABSTRACT

Provided is a geographic information transceiving system and method using a digital broadcasting network. The system and method segments new geographic and map data of a region, on which a geographic information service is provided, makes data segment files of different sizes, and multiplexes and transmits the files. A geographic information transmitting system includes: a geographic information collector for receiving real-time geographic information and real-time traffic information; a geographic information processor for extracting/processing local geographic information and local traffic information from the geographic information collecting means and outputting whole area information, geographic information and traffic information for a plurality of resolution levels; a digital broadcasting unit for converting and transmitting the geographic information/traffic information data in conformity to digital broadcast signals; a geographic information multiplexer for multiplexing the geographic information/traffic information data; and a transmitter for transmitting the multiplexed geographic information/traffic information data to a corresponding region.

11 Claims, 7 Drawing Sheets

FOREIGN PATENT DOCUMENTS

| | | |
|---|---|---|
| JP | 10-153440 | 6/1998 |
| JP | 2002-286458 | 10/2002 |
| KR | 1020000014782 A | 3/2000 |
| KR | 1020010029047 A | 4/2001 |
| KR | 1020020095766 A | 12/2002 |
| KR | 2003-0019538 | 3/2003 |
| KR | 1020030019538 A | 3/2003 |
| KR | 1020030059034 A | 7/2003 |

* cited by examiner

GEOGRAPHIC INFORMATION TRANSCEIVING SYSTEM AND METHOD THEREOF

The present patent application is a non-provisional application of International Application No. PCT/KR2004/002336, filed Sep. 14, 2004.

TECHNICAL FIELD

The present invention relates to a geographic information transceiving system using a digital broadcasting network and a method thereof; and, more particularly, to a geographic information transceiving system using a digital broadcasting network, the system that segments update data on map and geographic information of a nation or a region, on which the geographic information service is provided, into data segments of an appropriate size based on the number and distance of digital broadcast transmitting sites, transmits them through a transmitter by giving them a priority when a broadcasted signal is multiplexed based on the size of data and the amount of geographic information included in the data, and receives new map data which are requested by a receiving part with a digital broadcasting receiver and applies the update map data to vehicle and private navigations.

BACKGROUND ART

Many methods have been suggested to transmit simple geographical information and traffic information to a receiving part by using an analog or digital broadcasting system. Meanwhile, vehicle and private navigation require an electronic map of a region where a user is located along with Global Positioning System (GPS) signals.

Generally, an electronic map is provided in the form of a compressed database. So, it is stored in a memory of a navigation system and used when a navigation application program requires it. This type of electronic map has a problem that the size of the electronic map is different according to the amount of information reserved in it. Also, when geographic, road and topographic information are changed or updated, they should be stored in the same way as they are initially stored.

Therefore, conventional systems have problems that they should equip a high-capacity memory to store an electronic map in the memory and get a navigation service and that they need another network or a medium to upgrade data.

DISCLOSURE OF INVENTION

Technical Problem

It is, therefore, an object of the present invention to provide a geographic information transceiving system using a digital broadcasting network. The system and method segments new data on map and geographic information of the whole nation or a region, on which the geographic information service is provided, into data segments of an appropriate size based on the number and distance of digital broadcast transmitting sites, makes data segments files having a different data size based on a resolution and/or the significance of stored data, and transmits the files by multiplexing a digital broadcast signal according to significance. Then, a digital broadcast receiver receives new map data and applies them to vehicle and private navigations.

Technical Solution

In accordance with one aspect of the present invention, there is provided a geographic information transmitting system using a digital broadcasting network, including: a geographic information collecting unit for receiving real-time geographic information and real-time traffic information from a central/local geographic information collecting network; a geographic information processing unit for extracting/processing local geographic information and local traffic information from the geographic information collecting unit and outputting whole area information, and geographic information/traffic information for a plurality of resolution levels; a digital broadcasting unit for converting and transmitting the geographic information/traffic information data from the geographic information processing unit in conformity to digital broadcast signals; a geographic information multiplexing unit for multiplexing the geographic information/traffic information data transmitted from the digital broadcasting unit with local geographic information data; and a transmitting unit for transmitting the multiplexed geographic information/traffic information data to a corresponding region.

In accordance with another aspect of the present invention, there is provided a geographic information receiving system using a digital broadcasting network, including: a synchronizing unit for selecting/synchronizing signals transmitted from each transmitter; a demodulating unit for demodulating the synchronized signals; a demultiplexing unit for demultiplexing the demodulated signals; a data decoding unit for decoding the demultiplexed signals; a storing unit for storing the decoded data; a map data managing unit for managing the data stored in the storing unit and displaying a requested part of a map; and a navigation/display unit for displaying map data and perform navigation under the control of the map data managing unit.

In accordance with another aspect of the present invention, there is provided a method for transmitting geographic information by using a digital broadcasting network, including the steps of: a) collecting real-time geographic information and real-time traffic information from a central/local geographic information collecting network; b) extracting/processing local geographic information and local traffic information from the collected geographic information/traffic information and outputting whole area information and geographic information/traffic information for a plurality of resolution levels; c) converting and transmitting the outputted geographic information/traffic information data outputted from the step b) in conformity to digital broadcast signals; d) multiplexing the geographic information/traffic information data transmitted in the step c) with local geographic information data; e) performing encryption during the multiplexing in the step d) so that whether to allow a user to use the information be determined based on whether the user is a subscriber and what subscriber class the user belongs to; and f) transmitting the multiplexed geographic information/traffic information data to a corresponding region.

In accordance with another aspect of the present invention, there is provided a method for receiving geographic information by using a digital broadcasting network, including the steps of: a) selecting/synchronizing signals transmitted from each transmitter; b) demodulating the synchronized signals; c) demultiplexing the demodulated signals; d) decoding the demultiplexed signals; e) performing decryption during the decoding in the step d) by determining whether to allow a user to use the geographic information based on whether the user is a subscriber and what subscriber class the user belongs to; f) storing the decrypted data; g) managing the data stored in the step f) by using a map data managing unit and displaying a requested part of a map; and h) displaying map data and perform navigation under the control of the map data managing unit.

The present invention presents technology for providing geographic information including an electronic map of a region in a digital broadcasting network that provides service on the entire broadcasting area by using a plurality of transmitting sites. It overcomes problems of conventional vehicle navigation systems which necessitate a high-capacity memory installed therein to save an electronic map for navigation and that they have to use other networks or media for upgrading. According to the present invention, a receiver can manage high-volume map data efficiently by making electronic maps in a plurality of versions based on the amount of geographic information in the map data when the map data are formed, giving priority to the data, and transmitting them periodically to the receiver. It also made it possible to use up-to-date geographic information always by using a digital broadcasting receiver and provides easy access to new recent local geographic information during an emergency situation, or while a user walks or drives a vehicle.

DESCRIPTION OF DRAWINGS

The above and other objects and features of the present invention will become apparent from the following description of the preferred embodiments given in conjunction with the accompanying drawings, in which.

BEST MODE

Other objects and aspects of the invention will become apparent from the following description of the embodiments with reference to the accompanying drawings, which is set forth hereinafter. Thus, the technical concept of the present invention can be easily embodied by those skilled in the art. If any further description on widely known technology related to the present invention is determined to blur the point of the present invention, the description is omitted. Hereafter, preferred embodiments of the present invention will be described in detail with reference to the drawings.

Figure 1:
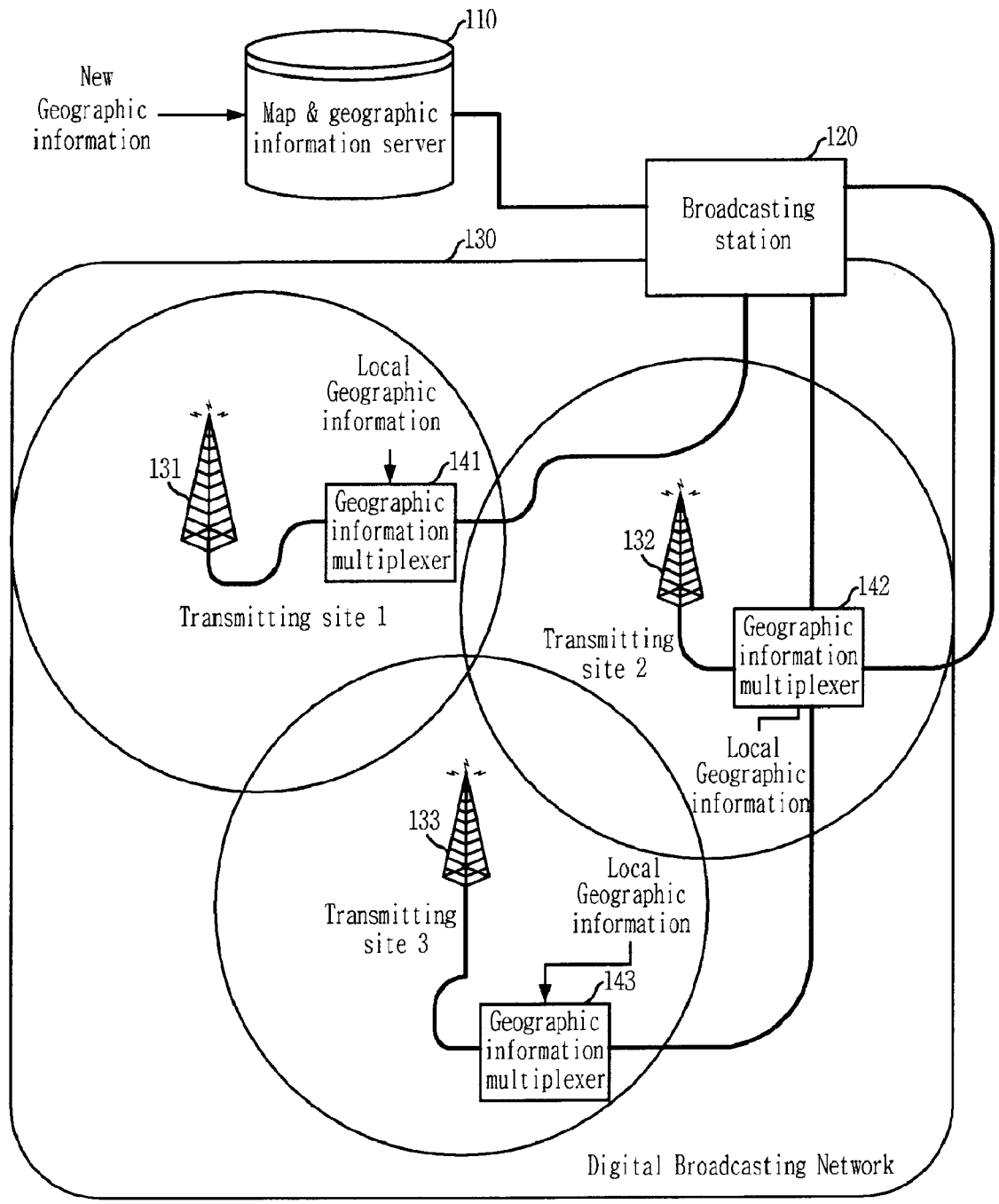
FIG. 1 is a diagram describing a geographic information transceiving system using a digital broadcasting network in accordance with an embodiment of the present invention.

FIG. 1 is a diagram describing a geographic information transceiving system using a digital broadcasting network in accordance with an embodiment of the present invention.

As shown, the geographic information transceiving system using a digital broadcasting network includes a map and geographic information server 110, a digital broadcasting network 130 and a digital broadcasting receiver (now shown). The map and geographic information server 110 collects recent map and geographic information and transmits it to the digital broadcasting network 130. The digital broadcasting network 130 transmits data transmitted from the map and geographic information server 110 to a region to which the navigation service is provided.

The digital broadcasting receiver (now shown) receives geographic information from the digital broadcasting network 130 and converts the geographic information into navigation information to be used by a user.

Here, the digital broadcasting network 130 includes a broadcasting station 120, a plurality of geographic information multiplexers 141 to 143, and transmitting sites 131 to 133. The broadcasting station 120 transmits data collected and processed by the map and geographic information server 110 to transmitters in conformity to output broadcast signals. The plurality of geographic information multiplexers 141 to 143 multiplex signals outputted from the broadcasting station 120 with local geographic information. The transmitting sites 131 to 133 transmit the signals multiplexed in the geographic information multiplexers 141 to 143 to the digital broadcast receiver.

The data collected and processed by the map and geographic information server 110 are transmitted to the broadcasting station 120 of the digital broadcasting network 130. The broadcasting station 120 transmits the processed data to the transmitting sites 131 to 133 in conformity to output broadcast signals for each transmitter. The transmitting sites 131 to 133 multiplex them with local geographic information by using the geographic information multiplexers 141 to 143 and then transmit the multiplexed signals. The digital broadcast receivers, which are scattered in each region, receive the map and geographic information transmitted from the transmitting sites 131 to 133 and apply it to navigation or local geographic information. Here, the digital broadcast receivers are not shown in FIG. 1 and they will be described more in the account of FIG. 3.

Figure 2:
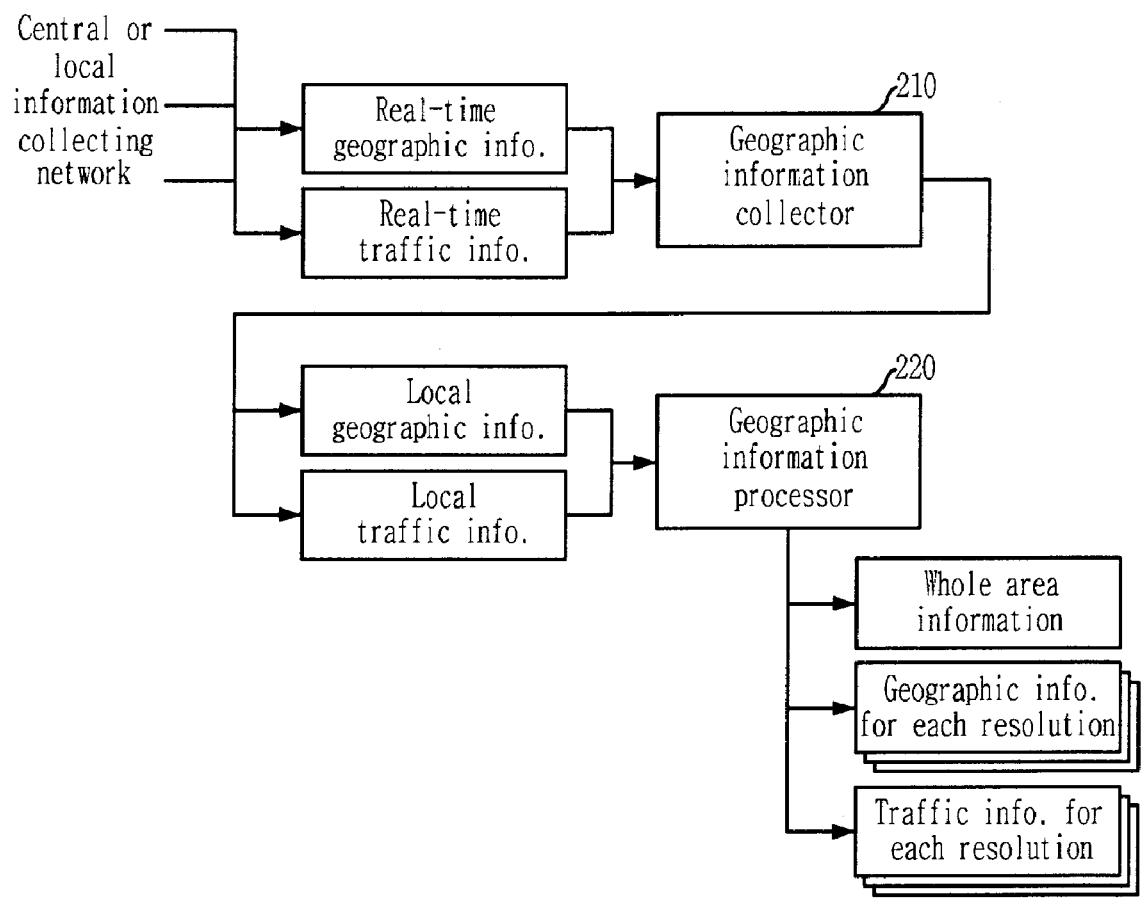
FIG. 2 is a block diagram depicting a geographic information transmitting system (which is a map and geographic information server) of the geographic information transceiving system in accordance with an embodiment of the present invention.

FIG. 2 is a block diagram depicting a geographic information transmitting system (which is a map and geographic information server) of the geographic information transceiving system in accordance with an embodiment of the present invention.

That is, FIG. 2 shows a process of processing information collected by using a national or local map and a geographic information network and extracting data required by digital broadcasting.

As shown, the map and geographic information server 110 includes a geographic information collector 210, a geographic information processor 220, the broadcasting station 120, the geographic information multiplexers 141 to 143, and the transmitting sites 131 to 133.

The geographic information collector 210 receives real-time traffic information and real-time geographic information from a central or local geographic information collecting network and collects geographic information and traffic information. The geographic information processor 220 extracts and processes local geographic information and local traffic information from the geographic information collector 210 and outputs entire region information, geographic information for each resolution, and traffic information for each resolution. The broadcasting station 120 converts the geographic information data and the local information data inputted from the geographic information processor 220 into data that conform to digital broadcast signals and performs transmission. The geographic information multiplexers 141 to 143 multiplex the geographic information data and the local information data transmitted from the broadcasting station 120 with local geographic information. The transmitting sites 131 to 133 transmit the geographic information data and the traffic information data which are multiplexed in the geographic information multiplexers 141 to 143 to a region corresponding to the data.

The map and geographic information server 110 of the present invention which has the above-mentioned structure is operated as follows.

The map and geographic information server 110 processes new data and provides the processed data to the broadcasting station 120 as soon as the new data are obtained so that the broadcasting station 120 could add the new data to information sent out to each region. Here, the processed geographic information are provided in several versions of map data having a different file size based on significances of the processed geographic information and map resolutions. When broadcasting station 120 receives geographic information from the map and geographic information server 110, it re-establishes the multiplexing structure of an existing geographic information broadcasting channel to send out new map data to the transmitting sites 131 to 133 based on a predetermined map division standard. Here, the broadcasting station 120 selects a proper map out of the map data having diverse file sizes, which are made in the map and geographic information server 110, in consideration of broadcasting conditions and the size of a broadcasting data channel, multiplexes the map data and adds them to broadcast signals, and transmit the resultant signals to the transmitting sites 131 to 133.

Figure 3:
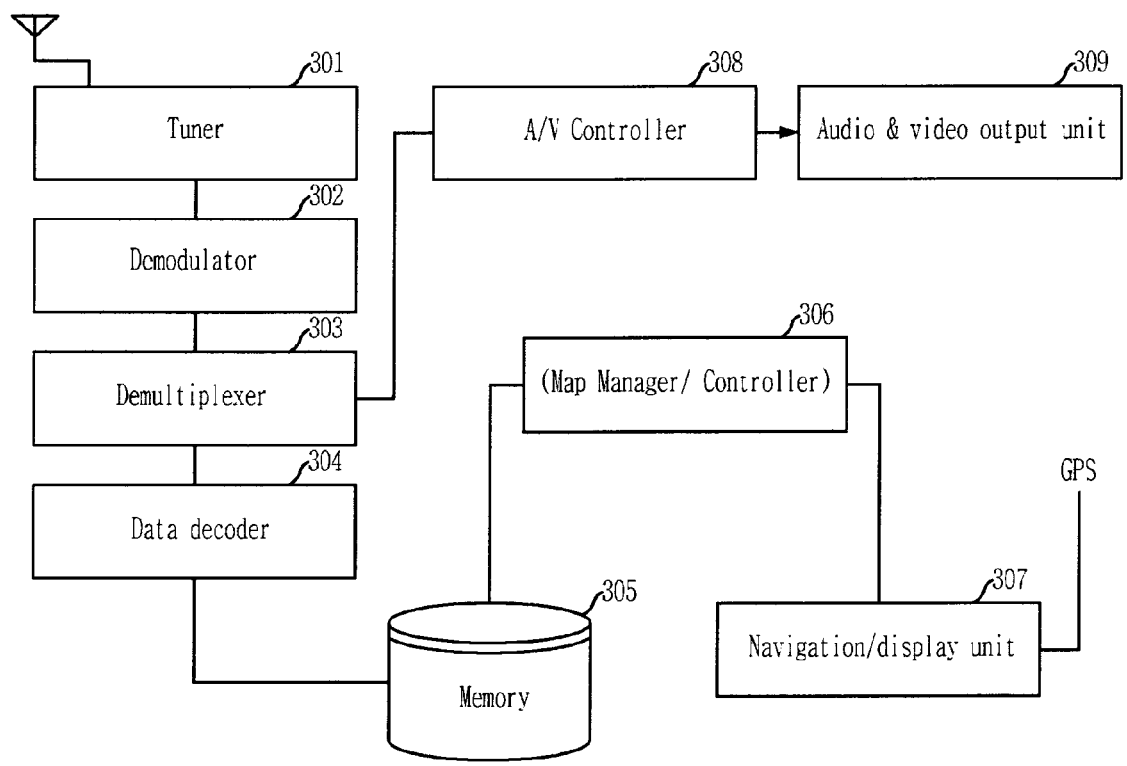
FIG. 3 is a block diagram depicting a geographic information receiving system (which is a digital broadcast receiver) of the geographic information transceiving system in accordance with an embodiment of the present invention.

FIG. 3 is a block diagram depicting a geographic information receiving system (which is a digital broadcast receiver) of the geographic information transceiving system in accordance with an embodiment of the present invention. The drawing shows a process of receiving map and geographic information by using a geographic information network which is formed based on digital broadcasting.

As shown, the digital broadcast receiver of the geographic information transceiving system, which is described in the present invention, includes a tuner 301, a demodulator 302, a demultiplexer 303, a data decoder 304, a memory 305, a map data manager 306, a navigation/display unit 307 and an audio/video (A/V) controller 308.

The tuner 301 selects and synchronizes signals outputted from the transmitting sites 131 to 133. The demodulator 302 demodulates the signals outputted from the tuner 301. The demultiplexer 303 demultiplexes the demodulated signals outputted from the demodulator 302. The data decoder 304 decodes the demultiplexed signals outputted from the demultiplexer 303. The memory 305 stores the decoded data outputted from the data decoder 304. The map data manager 306 manages the data stored in the memory 305 and displays a requested part. The navigation/display unit 307 displays map data under the control of the map data manager 306 and performs navigation. The audio/video (A/V) controller 308 controls and outputs audio/video data among the data outputted from the demultiplexer 303.

The digital broadcast receiver has a memory 305 with a capacity sufficient to store map data of at least three regions to receive and store all the data of the regions at a boundary point on the map.

The map data manager 306 performs a function of combining map data, which are decoded in each receiving module and stored in the memory 305, without cut-off at boundary points and displays a requested part on the navigation/display unit 307.

Map and geographic information data has data that are updated frequently and data that are rarely upgraded. Geographical names and location coordinates of a particular spot are those upgraded frequently. Therefore, if the map data to be transmitted are classified and a carousel period is adjusted, they can be transmitted more effectively.

If the digital broadcast receiver receives a local map for a certain level of resolution which is outputted from the geographic information processor 220 and the resolution of the received map is higher than that of an existing map (which means the received map is more elaborate than the existing one), the digital broadcast receiver replaces the existing map with the new one or upgrades the changed part.

Also, among the data that are rarely changed, data such as segment numbers of a map, location information and location coordinates of a particular point, are not upgraded frequently. If these data are saved in the memory 305 during the manufacturing of the digital broadcast receiver, they can be used usefully for setting up the location of a destination point on a map in a long-distance vehicle navigation because the location is already saved in the memory 305. In short, in a navigation apparatus, the current location becomes a departure point and a destination is designated by searching a geographical name saved in the memory 305 in advance or an area around the destination. If the destination is a place already saved in the memory 305, a navigation service is provided directly by using the map in the memory 305. Otherwise, if the destination is a far-away place not saved in the map of the memory 305, the navigation apparatus first finds out and presents a best place for going to the destination within the map saved in the memory 305 and then, when it arrives at the place, it downloads a map of the region and finds out the best route for the next destination to go the final destination instantly.

Figure 4:
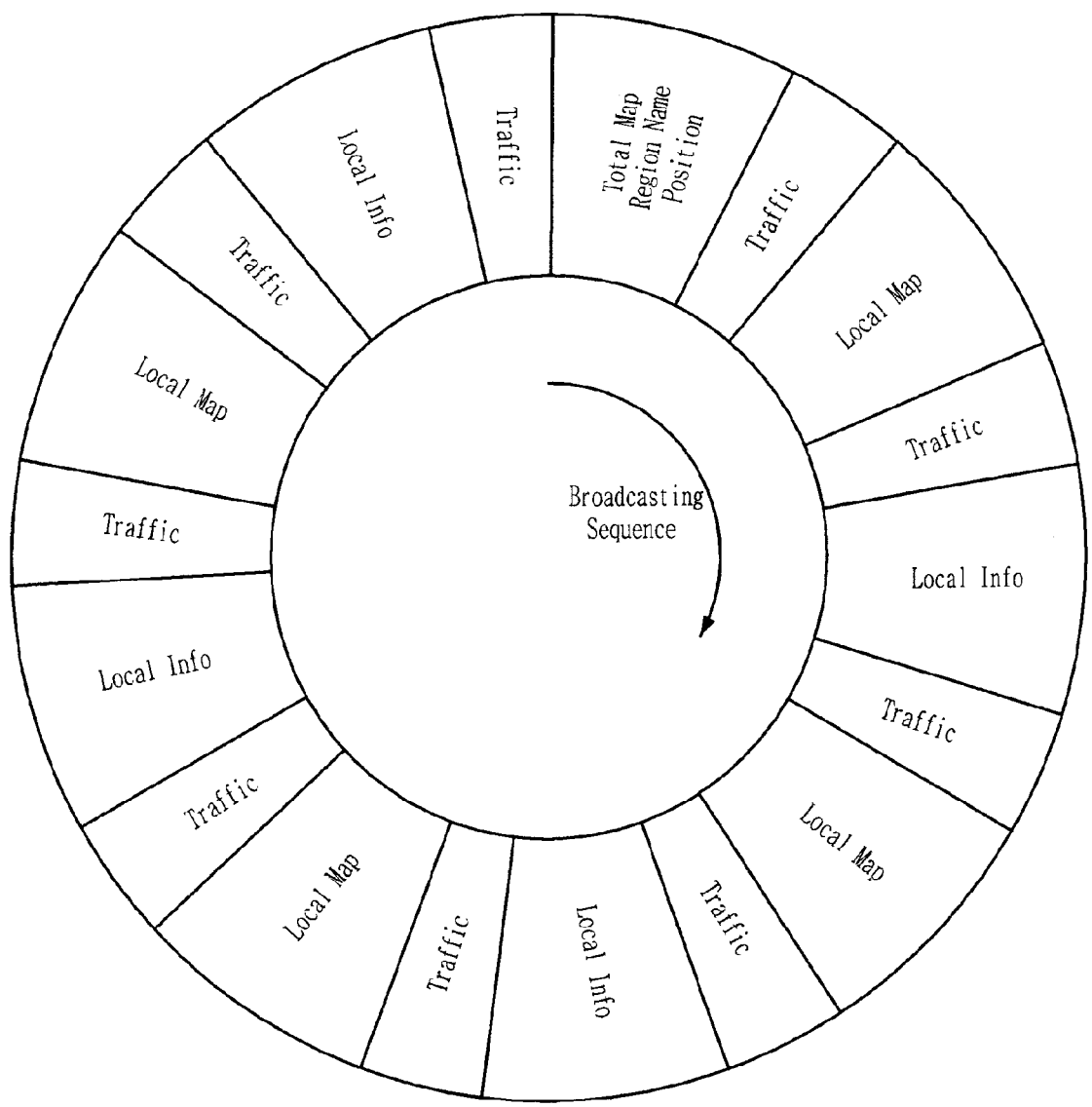
FIG. 4 is a diagram describing a multiplexing process based on the characteristics of the geographic information in the geographic information transceiving system in accordance with an embodiment of the present invention.

FIG. 4 is a diagram describing a multiplexing process based on the variation of geographic information in the geographic information transceiving system in accordance with an embodiment of the present invention. It shows an example of a carousel where map and geographic information data of an appropriate size for a resolution and version with broadcast signals.

As shown, data that correspond to the entire region and has little variation are sent out in a relatively long time period and data that are changed and used frequently such as traffic data are generated and transmitted rather frequently.

Each transmitter transmits broadcast signals from the broadcasting station to its broadcasting coverage.

Figure 5:
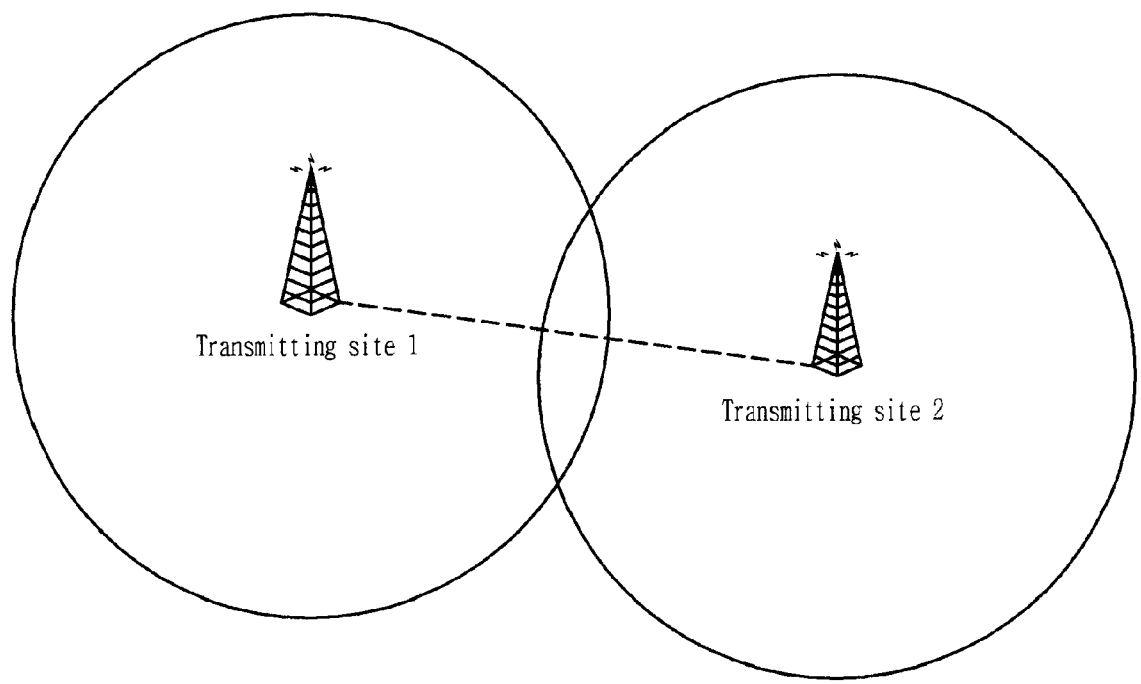
FIG. 5 is a diagram showing a map segmenting process in the geographic information transceiving system in accordance with an embodiment of the present invention.

FIG. 5 is a diagram showing a map segmenting process in the geographic information transceiving system in accordance with an embodiment of the present invention. It presents description on how much area is to be overlapped when the transmitting sites 131 to 133 divide map data of each region which will be multiplexed and transmitted with digital broadcast signals, which are transmitted by itself.

Basically, once the digital broadcast receiver receives map data, it stores the map data in the memory 305 as shown in the digital broadcast receiver of FIG. 3 until the map data exceed a proper capacity level, and it stores a map of a new region in the remaining memory area if it moves to a new map area as the vehicle moves.

If the stored map data exceed the proper capacity level, the digital broadcast receiver manages the memory 305 by deleting the stored map data for the region where the digital broadcast receiver is located or from those with the lowest usage frequency.

When two map segments are received from two adjacent transmitting sites, the margins of the two map segments should be overlapped in order to make no empty space appear on the map received by the receiver. The value can be determined as a multiplication of the maximum speed of the mobile station (i.e., vehicle) by a time consumed to receive all map data of the lowest resolution in the region. By doing so, map data of the region can be received before the receiver or the receiving vehicle enters the new region. Here, the time for receiving map data from a transmitting site goes in proportion to the size (resolution or the amount of information) of the map data for the region.

Figure 6:
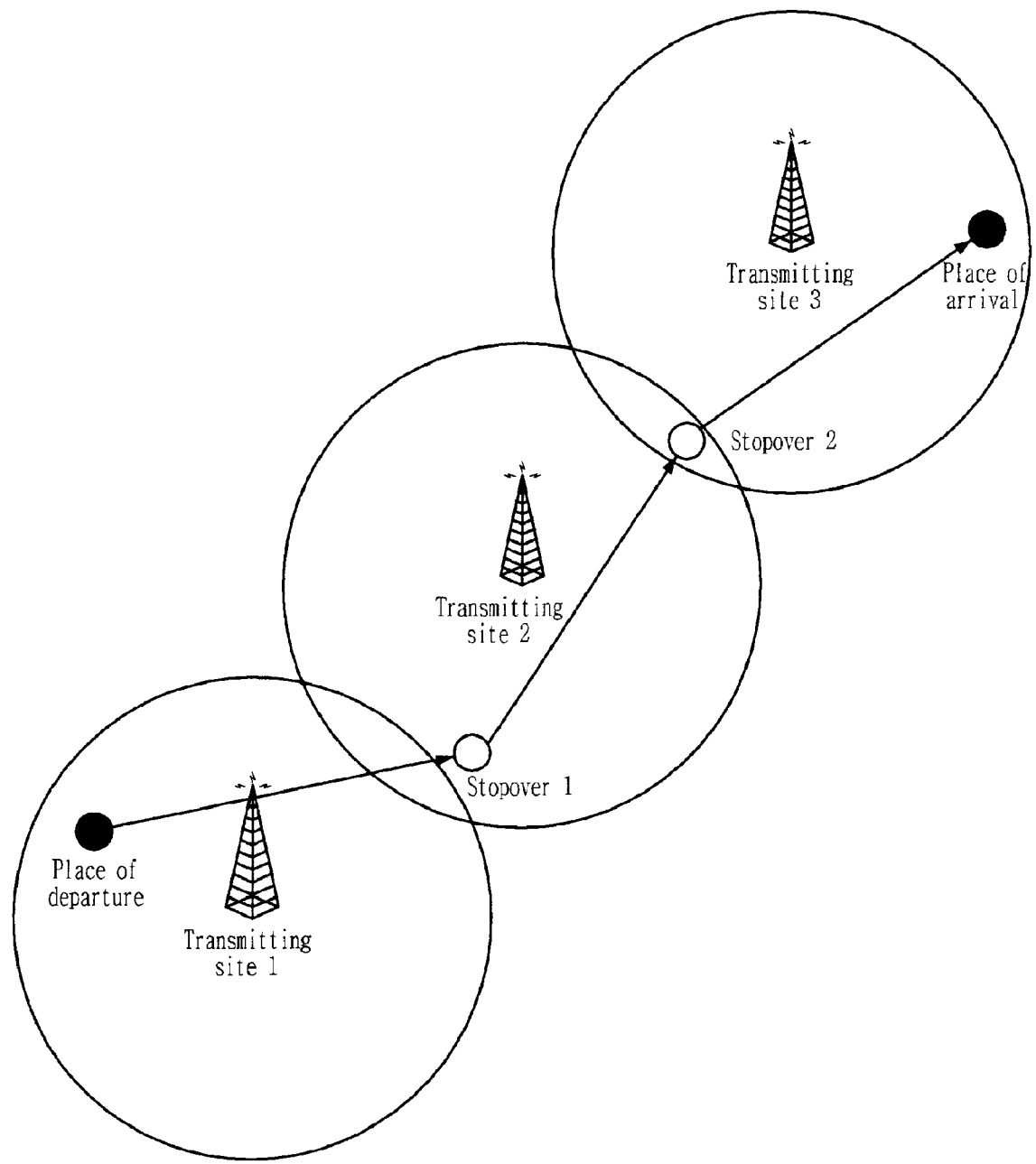
FIG. 6 is a long-distance navigation process in the geographic information transceiving system in accordance with an embodiment of the present invention.

FIG. 6 is a long-distance navigation process in the geographic information transceiving system in accordance with an embodiment of the present invention.

As shown, the current location becomes a departure point and a destination point is determined by searching the name of the destination which is stored in the memory 305 in advance or by searching the area near the destination point. If the destination point is in the map stored in the memory 305, the navigation service is provided by using the map. Otherwise, if the destination point is a far-away place, the best place of the map for going to the destination point is presented. Then, when the vehicle arrives in the place, it downloads a map of the region and finds out the best route for the next destination to go to the final destination instantly.

Figure 7:
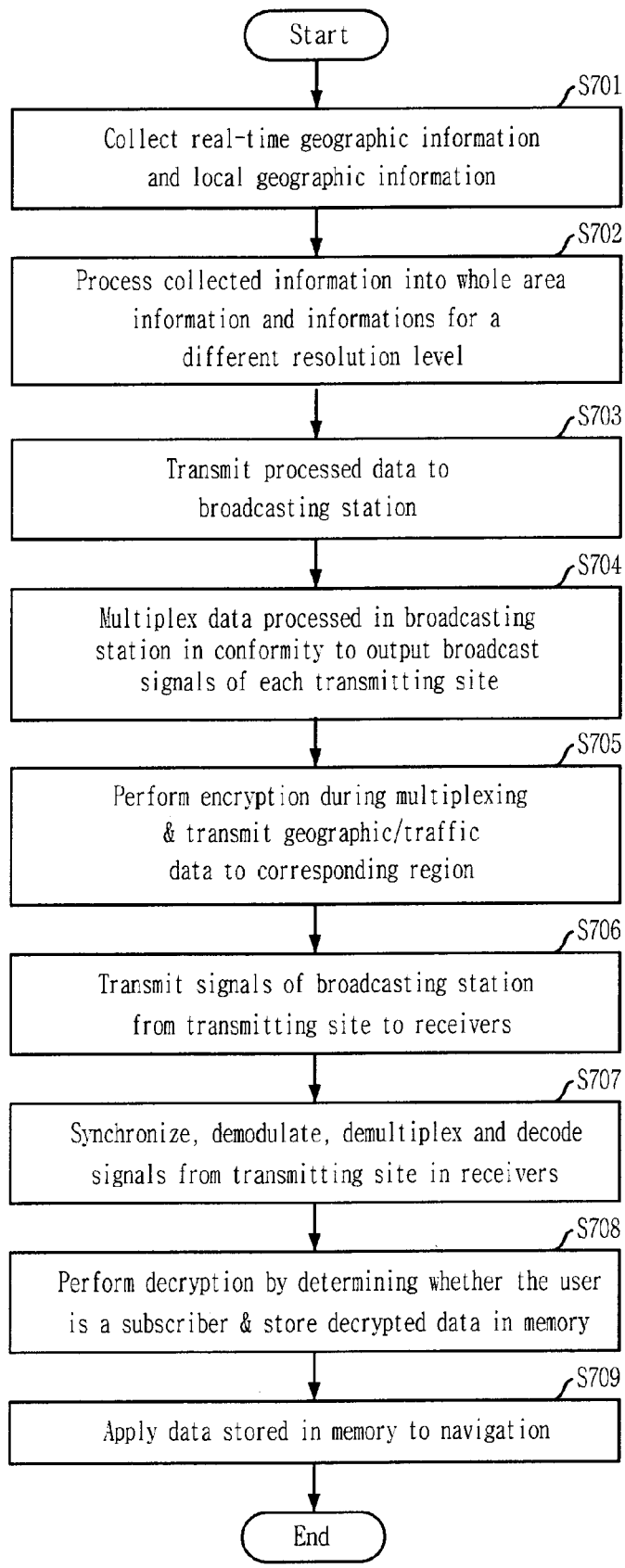
FIG. 7 is a flowchart describing a geographic information transceiving method using a digital broadcasting network in accordance with an embodiment of the present invention.

FIG. 7 is a flowchart describing a geographic information transceiving method using a digital broadcasting network in accordance with an embodiment of the present invention.

At step S701, real-time geographic information and local geographic information are collected from the central or local geographic information collecting network. At step S702, the collected information is processed into entire region information and geographic information for several resolutions and, at step S703, the processed information to the broadcasting station.

At step S704, the data transmitted to the broadcasting station are multiplexed in conformity to the output broadcast signals of each transmitting site.

Subsequently, at step S705, the data are encrypted during multiplexing and whether to allow a user to use the information is determined based on whether the receiver is a subscriber and what subscriber class the receiver belongs to.

Here, at step S706, if the transmitting site transmits the signals from the broadcasting station to the receiver, at step S707, the receiver performs synchronization, demodulation, demultiplexing and decoding. At step S708, the receiver performs decryption by determining whether to allow the use of the data based on whether the receiver is a subscriber and what subscriber class it belongs to during decoding, and stores the decrypted data in the memory. At step S709, the stored data are applied to the navigation service.

As described above, the method of the present invention can be embodied in the form of a program and stored in a computer-readable recording medium, such as CD-ROM, RAM, ROM, floppy disks, hard disks, magneto-optical disks and the like. Since this process can be easily performed by those of ordinary skill in the art, it will not be described herein.

The technology of the present invention can overcome a problem of performing map upgrade in the receiver whenever there are data to be upgraded by segmenting new map data on the map and geographic information of a nation or a local area, on which the navigation service is provided, into an appropriate size based on the number and distance of digital broadcast transmitting sites and transmitting the segment map data through transmitters. Since the receiving part receives the new map data through a digital broadcast receiver and uses the updated map by combining map segments. Therefore, the memory capacity of the receiver can be reduced or the amount of information to be transmitted to the receiver can be increased.

While the present invention has been described with respect to certain preferred embodiments, it will be apparent to those skilled in the art that various changes and modifications may be made without departing from the scope of the invention as defined in the following claims.

What is claimed is:

1. A geographic information transmitting system using a digital broadcasting network, comprising:
   a geographic information collector configured to receive real-time geographic information and real-time traffic information from a central/local geographic information collecting network;
   a geographic information processor configured to extract and process the received geographic information and real-time traffic information and output whole area information, and geographic information/traffic information for a plurality of resolution levels;
   a digital broadcasting station configured to convert and transmit the outputted geographic information/traffic information in conformity to digital broadcast signals;
   a geographic information multiplexor configured to multiplex the transmitted geographic information/traffic information with local geographic information data; and
   a transmitter configured to transmit the multiplexed geographic information/traffic information data to a corresponding region.

2. The transmitting system as recited in claim 1, wherein the digital broadcasting station receives the geographic information from the geographic information processor and reestablishes a multiplexing structure of an existing geographic information broadcasting channel to transmit the geographic information to the transmitter based on a predetermined standard for map segmentation.

3. The transmitting system as recited in claim 2, wherein the digital broadcasting station multiplexes the map data of a plurality of sizes, which are transmitted from the geographic information processor, with the digital broadcast signals based on a map selection standard and a data retransmission period, which is determined according to a frequency of data change, in consideration of broadcasting conditions and the size of the broadcasting data channel and transmits the multiplexed map data to the transmitter.

4. The transmitting system as recited in claim wherein herein the geographic information processor processes update data as soon as the update data are received and adds the update data to information transmitted to each region by providing a plurality of map data versions which have a different file size based on significance of the geographic information and a level of resolution.

5. A geographic information receiving system using a digital broadcasting network, comprising:
   a synchronizer configured to select and synchronize signals transmitted from a plurality of transmitters;

a demodulator configured to demodulate the synchronized signals;

a demultiplexor configured to demultiplex the demodulated signals;

a data decoder configured to decode the demultiplexed signals;

a storing unit for storing the decoded data;

a map data manager configured to manage the stored decoded data and display a requested part of a map; and a navigation/display unit configured to display map data and perform navigation under the control of the map data managing means.

6. The receiving system as recited in claim 5, further comprising:

an audio/video controller configured to control audio/video data among the demultiplexed signals.

7. The receiving system as recited in claim 5, wherein the map data manager combines the map data stored in the storing unit at boundary points so that there is no data vacancy, and displays a requested part of the map on the navigation/display unit.

8. The receiving system as recited in claim 5, wherein the storing unit has a sufficient capacity to store map data of at least three regions so as to receive and store map data for all regions that involve in boundary of map segments and stores map segment numbers and location coordinates of a particular point in advance.

9. The receiving system as recited in claim 5, wherein once the storing unit receives map data, the storing unit stores the map data until the map data exceed a predetermined capacity level and, if a vehicle moves to a new region, the storing unit stores map data for the new region in the remainder of the storing unit; and if the map data exceed the predetermined capacity level, the storing means unit deletes the stored map data from the data with the lowest usage frequency.

10. A method for transmitting geographic information by using a digital broadcasting network, comprising the steps of:

a) collecting real-time geographic information and real-time traffic information from a central/local geographic information collecting network;

b) extracting/processing local geographic information and local traffic information from the collected geographic information/traffic information and outputting whole area information and geographic information/traffic information for a plurality of resolution levels;

c) converting and transmitting the outputted geographic information/traffic information data outputted from the step b) in conformity to digital broadcast signals;

d) multiplexing the geographic information/traffic information data transmitted in the step c) with local geographic information data;

e) performing encryption during the multiplexing in the step d) so that whether to allow a user to use the information be determined based on whether the user is a subscriber and what subscriber class the user belongs to; and f) transmitting the multiplexed geographic information/traffic information data to a corresponding region.

11. A method for receiving geographic information by using a digital broadcasting network, comprising the steps of:

a) selecting/synchronizing signals transmitted from a transmitter;

b) demodulating the synchronized signals;

c) demultiplexing the demodulated signals;

d) decoding the demultiplexed signals;

e) performing decryption during the decoding in the step d) by determining whether to allow a user to use the geographic information based on whether the user is a subscriber and what subscriber class the user belongs to;

f) storing the decrypted data;

g) managing the data stored in the step f) by using a map data managing unit and displaying a requested part of a map; and h) displaying map data and perform navigation under the control of the map data managing unit.

* * * * *